Oct. 28, 1969 A. G. WEYRICH ET AL 3,474,753

READ OUT RING SIGNALLING DEVICE

Filed Jan. 15, 1968 2 Sheets-Sheet 1

Inventors
Arthur G. Weyrich
and Werner Engelmann
By Bair, Freeman & Molinare Attys.

READ OUT RING SIGNALLING DEVICE

Filed Jan. 15, 1968 2 Sheets-Sheet 2

Inventor:
Arthur G. Weyrich
and Werner Engelmann
By Bair, Freeman & Molinare Attys United States Patent Office 3,474,753
Patented Oct. 28, 1969

3,474,753
READ OUT RING SIGNALLING DEVICE

Arthur G. Weyrich, Rolling Meadows, and Werner Engelmann, Chicago, Ill., assignors to Amerline Corporation, a corporation of Illinois
Filed Jan. 15, 1968, Ser. No. 697,997
Int. Cl. G01d *21/00;* G11b *5/00*
U.S. Cl. 116—114 5 Claims

ABSTRACT OF THE DISCLOSURE

A device for signalling the presence of a read out ring in the hub of a computer tape reel. A pin is reciprocally mounted in the reel hub for movement in a direction normally parallel to the axis of the hub. One end of the pin extends into a chamber on the front side of the hub, and the other end of the pin extends into a space on the rear side of the hub, which space is used for receiving a read out ring. A spring is mounted in the chamber and has a fixed end and a free end. The spring normally biases the pin in a direction towards the read out ring space. Sight means are provided on the free end of the leaf spring and moves to a position against the inner side of the window in response to movement of the pin away from the read out ring space and towards the chamber, as the read out ring is inserted into its space in the hub.

BACKGROUND OF THE INVENTION

Field of the invention and description of the prior art

This invention relates to a device for use in a reel for computer tape wherein the device signals the presence of a read out ring in the hub of the device so as to avoid undesired erasing of computer tape.

In the use of information stored on magnetic tape for computers, such information, after use, may be erased from the tape. On the other hand, the information stored on a computer tape may be used repeatedly and may never be removed, or the information may be removed only after extensive repeated use of the same information. In order to actuate mechanism on a computer for erasing information on the tape, a computer or a tape drive commonly includes a projecting actuator for actuating a limit switch, which is turn actuates a system which erases the tape stored on the particular reel.

The actuator normally extends into an annular channel provided in the hub of a tape reel. The recessed channel is provided so that the actuator does not contact any portion of the hub and therefore does not activate the tape erasing system. When it is desired to erase the information stored on the computer tape, a device commonly known as a "readout ring" is firmly positioned into the annular channel. The read out ring fills the annular space in the channel and has an outer surface substantially coextensive with the reel flange. Since the channel is filled by the read out ring, the actuator is pushed inwardly and the erasing system is activated, and the information stored on the particular tape is erased.

The read out ring is normally placed on the rear side of the annular reel or on the side of the reel facing the computer. Thus, when the computer tape reel is in place on the computer, the operator has no way of determining whether or not the read out ring is in place. As a result, if the information on the tape is to be erased and the read out ring is not in place on the reel, the operator would be inconvenienced because of having to erase the tape later.

A far more serious problem occurs when the read out ring is in place for erasing, but the information should not be erased. By the accidental positioning of the read out ring on the reel, the ring not being visible to the operator, valuable information may be erased from the computer tape. It would clearly be highly desirable to provide means on the reel visible on the front side of the tape reel or on the side away from the computer for enabling the operator to readily determine whether or not the read out ring is in place. By the use of a signal visible from the front side, errors in erasing the tape or in not erasing tape are substantially avoided. It is important that such signalling means are to be seen only when the read out ring is in place, but that the signalling means is to be substantially out of sight when there is no read out ring in place on the hub.

SUMMARY OF THE INVENTION

It is therefore an important object of the present invention to provide a device for signalling on the front side of a computer tape reel when a read out ring is positioned in the hub on the rear side of the tape reel.

It is also an object of this invention to provide a device for signalling the presence of a read out ring wherein the device is visible only when a read out ring is present and is substantially out of sight when the read out ring is not on the reel.

It is a further object of this invention to provide a device for signalling the presence of a read out ring in the hub of a tape reel wherein the device is particularly characterized by its simplicity and economy of construction, manufacture and operation.

Further purposes and objects of this invention will appear as the specification proceeds.

Generally, our improved device for signalling the presence of a removable read out ring in the hub of a tape reel includes a pin located in the hub which is reciprocal in a direction substantially parallel with the axis of the hub. A chamber is located in the front portion of the hub and a space is provided in the rear side of the hub for receiving the read out ring. The front end of the pin extends into the chamber while the rear end of the pin extends into the space. A spring is located in the chamber and includes a free end which is aligned with the front end of the pin and the spring includes an end which is secured or fixed in place within the chamber. The leaf spring normally biases the rear end of the hub into the read out ring space. A window normally encloses the outer side of the chamber. A sighting member is provided on the free end of the leaf spring and is movable into position substantially against the inner side of the window in response to the pin being forced into the chamber when a read out is placed in the space.

BRIEF DESCRIPTION OF THE DRAWINGS

One particular embodiment of the present invention is illustrated in the accompanying drawings, wherein.

DESCRIPTION OF THE PREFERRED EMBODIMENT

Figure 1:
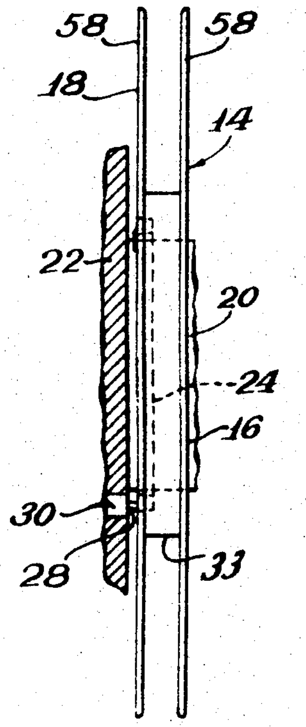
FIGURE 1 is a side elevational view of a computer tape reel, utilizing my improved read out ring signalling device, in place on a computer.
Figure 2:
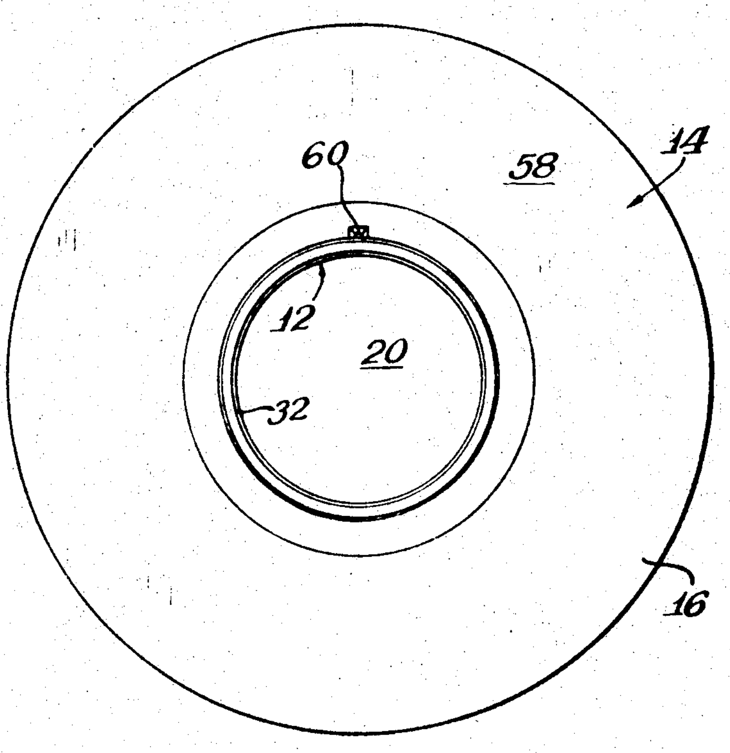
FIGURE 2 is a front elevational view of the tape reel of the embodiment of FIGURE 1.

Referring to the accompanying drawings, particularly FIGURES 1 and 2, my read out ring signalling device, generally 10, is contained within a hub, generally 12, of a reel 14 for storing computer tape. The device 10 is viewable only from the front side 16 of the reel 14. The rear side 18 of the reel 14 is mounted adjacent a computer, generally 22, when the reel 14 is upon the drive spindle 20 of the computer 22. In FIGURE 1, the read out ring, generally 24, is positioned within an annular channel or space 26 at the rear side 18 of the reel 14. An actuator 28 for a switch 30 is aligned with the annular space 26 and normally extends into the space 26 when there is no read out ring 24 present within the space 26. As shown in FIGURE 1, when the read out ring 24 is present in the annular space 26, the actuator 28 is moved inwardly towards the computer 22 to thereby actuate the switch 30 which activates the erasing system (not shown) to erase the tape stored in the reel 14.

Figures 5, 6, 7:
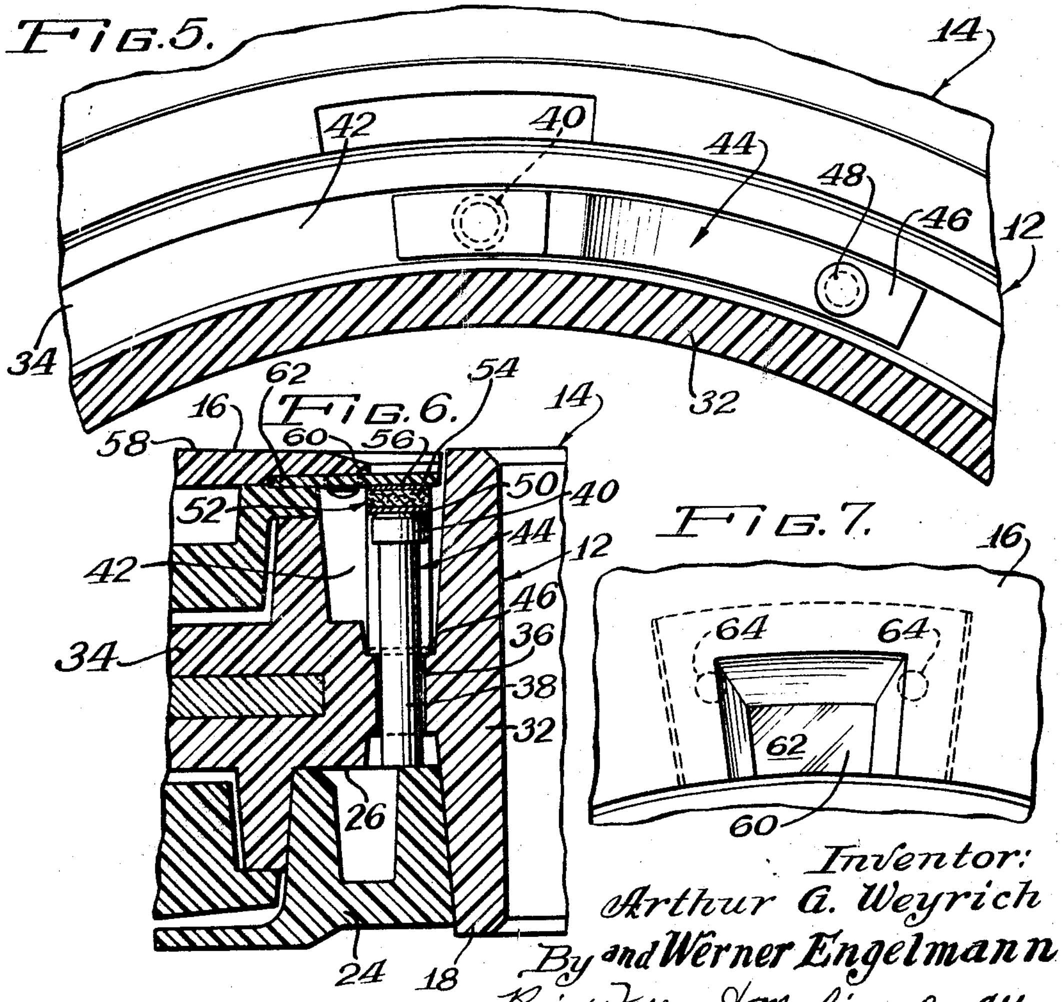
FIGURE 5 is a sectional view taken along the line 5—5 of FIGURE 3, showing the internal portion of the read out ring signalling device.
FIGURE 6 is a cross-sectional view through the signalling device taken along the line 6—6 of FIGURE 3.
FIGURE 7 is a fragmentary top plan view of the window which encloses the chamber for the read out ring signalling device.

Referring particularly to FIGURE 6, the reel hub 12 includes an inner peripheral rim 32 which mounts upon the spindle 20. A web 34, positioned intermediate the opposite edges of the rim 32, extends to the central portion of an outer rim, 33, shown only in FIGURE 1. The annular channel 26, as shown in FIGURES 5 and 6, is positioned adjacent and outward of the inner surface of the inner rim 32.

Figure 4:
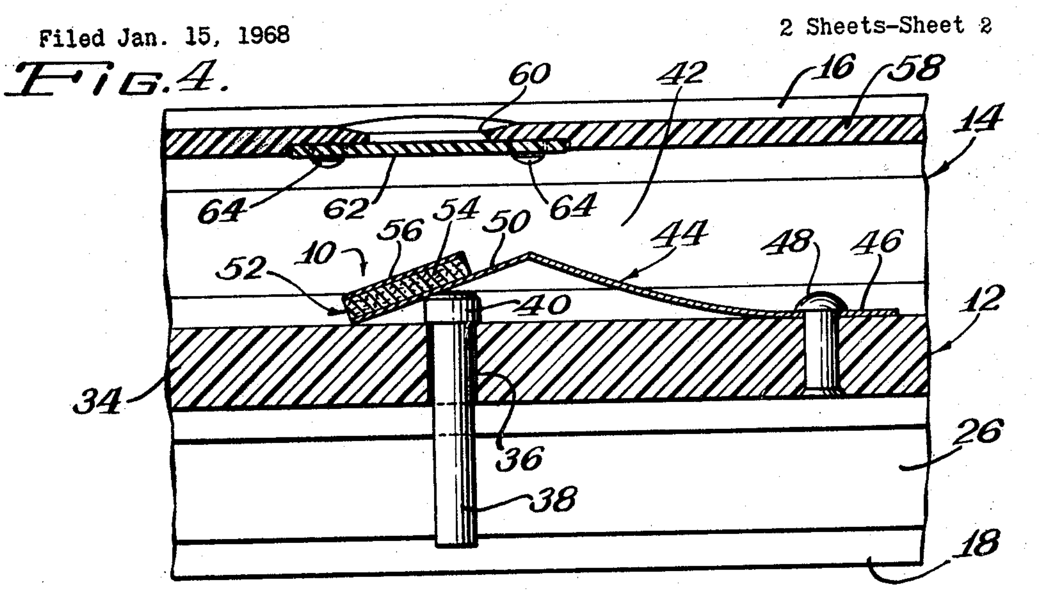
FIGURE 4 is a view similar to FIGURE 3 except that the read out ring signalling device is shown in position when no read out ring is present in the hub of the reel.

An aperture 36, substantially parallel to the axis of the reel 14, passes through the web 34 at a point closely adjacent the inner rim 32. A pin 38 is reciprocally mounted within the aperture 36. The pin 38 includes an enlarged head 40, which, as shown in FIGURE 4, is normally locked in position in a chamber 42 at the front side 16 of the reel 14 or on the side of the web 34 which is opposite to that of the annular channel 26. The rear end of the reciprocal pin 38 is normally located in the annular channel 26, as shown in FIGURE 4, when there is no read out ring 24 present within the channel 26. The enlarged head 40 of the pin has a diameter greater than that of the aperture 36 so that it is not possible for it to pass through the aperture 36.

A spring, preferably a leaf spring 44, is mounted or fixed at one end 46 to the front surface of the web 34 in the chamber 42 by a rivet 48. The other end 50 of the leaf spring 54 is freely movable. The leaf spring, being confined within the arcuate front chamber 42, is also arcuate in shape. The free end 50 of the leaf spring 44 is substantially flat and is offset from the main body of the leaf spring 44, which is maintained slightly arcuate in shape, as shown best in FIGURES 3 and 4, to provide the desired biasing. As shown in FIGURE 4, the spring 44 normally bears against the head 40 of the pin 38 to bias it in a direction towards the read out ring space 26.

The outer face of the free end 50 of the spring 44 has a viewing or sighting member, generally 52, mounted thereon. Desirably, the sight member 52 includes a compressible foam pad 54, which has a strip of luminous or readily viewable material 56 adhesively mounted thereon. As shown in FIGURE 4, it is important that the upper surface of the luminous material 56 is offset from the plane of the flanges 58 of the reel 14 so in the non-viewing position, it is substantially not visible. The front chamber 42 is enclosed by a portion of one of the tape reel flanges 58, which has an aperture 60 therein. The lower side of the aperture 60 is covered by a transparent or translucent window 62 which is secured in place by rivets 64. The window 62 is in alignment with the upper surface of the pin 38 and is also in alignment with the sight member 52. As explained previously, since the outer surface of the luminous material 56 is diagonal to the axis of the window 62, it is substantially impossible to view the sighting member 52 when it is in the position shown in FIGURE 4, that is, when spaced away from the window in a diagonal position when the read out ring is not in the space 26. Light rays passing through the window 62 are not reflected directly back through the window because of the diagonal position of the luminous portion 56 on the sighting member 52.

Figure 3:
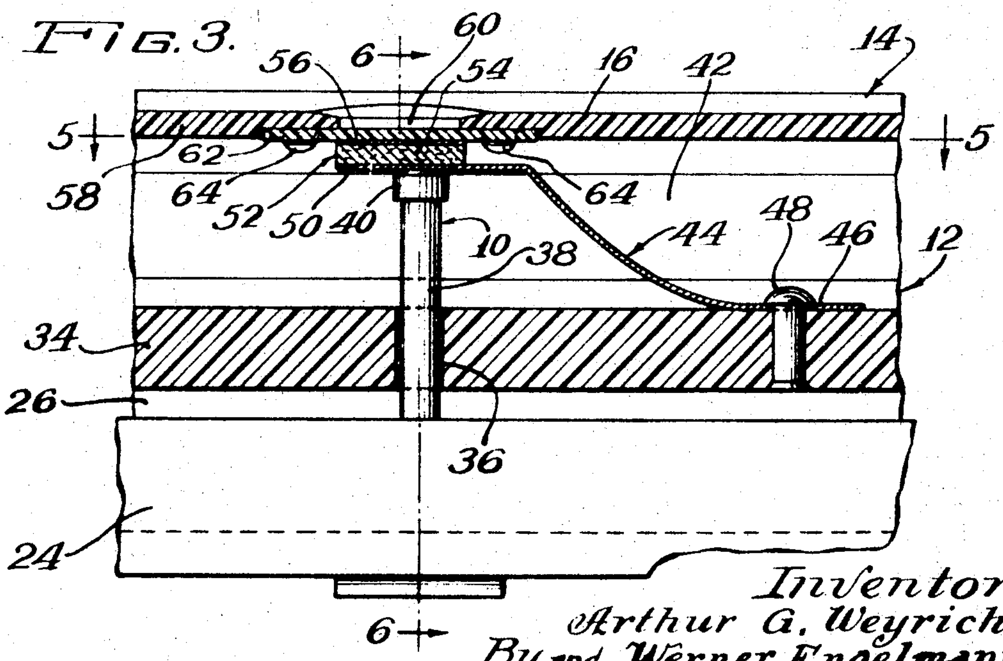
FIGURE 3 is an enlarged sectional view through the portion of the hub of a tape reel showing the position of the read out ring signalling device when the read out is positioned in the hub.

When the read out ring 24 is inserted into the annular channel 26, as shown in FIGURES 3 and 6, the rear end of the pin 38 contacts the lower surface of the plastic read out ring 24 and is pushed in a direction towards the front side 16 of the reel 14. As the pin 38 moves to the front side 16, it also bears against the lower surface of the fixed end 46 of the leaf spring 44 lifting the free end 50 of the spring 44 as well as the sight member 52 outwardly towards alignment with the lower surface of the window 62. When the luminous portion 56 of the sighting member 52 is in position against the lower surface of the window 62, the read out signalling device is readily viewed from the front side 16 of the reel 14 regardless of whether the operator is directly in line with the window or not. The compressibility of the foam pad 54 assures that the luminous portion 56 bears firmly against the window 62 to provide clear viewing of the sight member 52. Thus, by the use of the described device, an operator standing at the front side 16 of the reel 14 knows definitely whether a read out ring is or is not in place in the annular space 26. Thereby, the disadvantages of not erasing the tape when desired and the more significant disadvantages of erasing the tape when no erasure is desired are avoided.

While in the foregoing, there has been provided a detailed description of a particular embodiment of the present invention, it is to be understood that all equivalents obvious to those having skill in the art are to be included within the scope of the invention as claimed.

What we claim and desire to secure by Letters Patent is:

1. A device for signalling the presence of a removable read out ring in the hub of a tape reel, said device comprising a pin positioned in said hub for reciprocating movement in a direction parallel to the axis of said hub, said pin having a front end and a rear end, a chamber on the front side of said hub, a space in the rear side of said hub for receiving said read out ring, said front end of said pin extending into said chamber, said rear end of said pin normally extending into said space, a spring mounted in said chamber, said spring having a free end aligned with said front end and having a fixed end, said spring normally biasing said rear end into said space, a window enclosing the front side of said chamber, and sighting means on the free end of said spring and being movable to a position for external viewing against the inner side of said window as said pin is moved into said chamber when a read out ring is inserted in said space.

2. The device of claim 1 wherein said spring is a leaf spring, and said sighting means includes planar luminous material for positioning against said inner side of said window.

3. The device of claim 1 wherein the plane of said sighting means is normally diagonal of the surface of said window when said read out ring is not in said space.

4. The device of claim 3 wherein said window is normally substantially perpendicular to the axis of said hub, and said sighting means is normally diagonal of the axis of said hub, and is substantially perpendicular to said axis only when said read out ring is in place on said reel.

5. The device of claim 1 wherein said sighting means includes a compressible pad on said spring, a strip of luminous material is on the outer surface of said pad, and said luminous material is movable to a position against the inner surface of said window in response to the positioning of a read out ring in said space.

References Cited

UNITED STATES PATENTS

| | | | |
|---|---|---|---|
| 2,282,044 | 5/1942 | Fairbanks. | |
| 2,910,957 | 11/1959 | Gustig | 116—114 |
| 3,199,093 | 8/1965 | Cheney | 340—174.1 |

OTHER REFERENCES

I.B.M. Technical Disclosure Bulletin, Visual Indicator for Tape Reel, G. L. Smith, vol. 8, No. 10, March 1966.

LOUIS J. CAPOZI, Primary Examiner

U.S. Cl. X.R.

179—100.2; 242—71.8; 340—174.1